May 15, 1962  R. A. O'NEILL  3,034,666
ELEVATOR APPARATUS
Filed Sept. 5, 1958  6 Sheets-Sheet 1

INVENTOR
RALPH A. O'NEILL
BY John Gibson Semmes
ATTORNEY

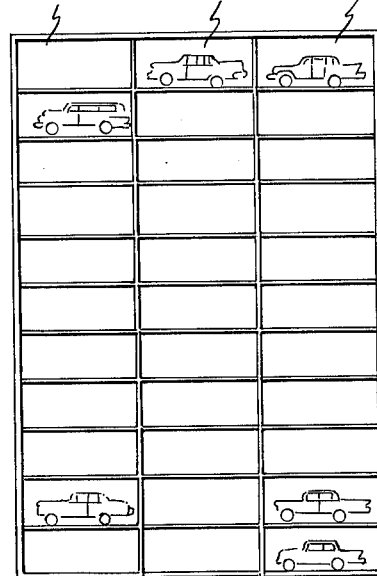
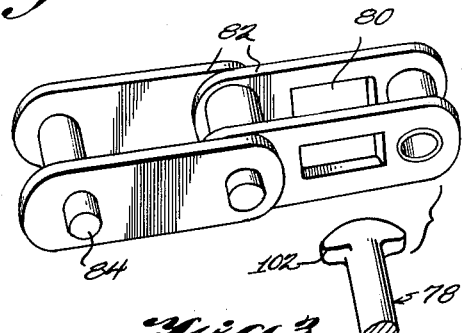
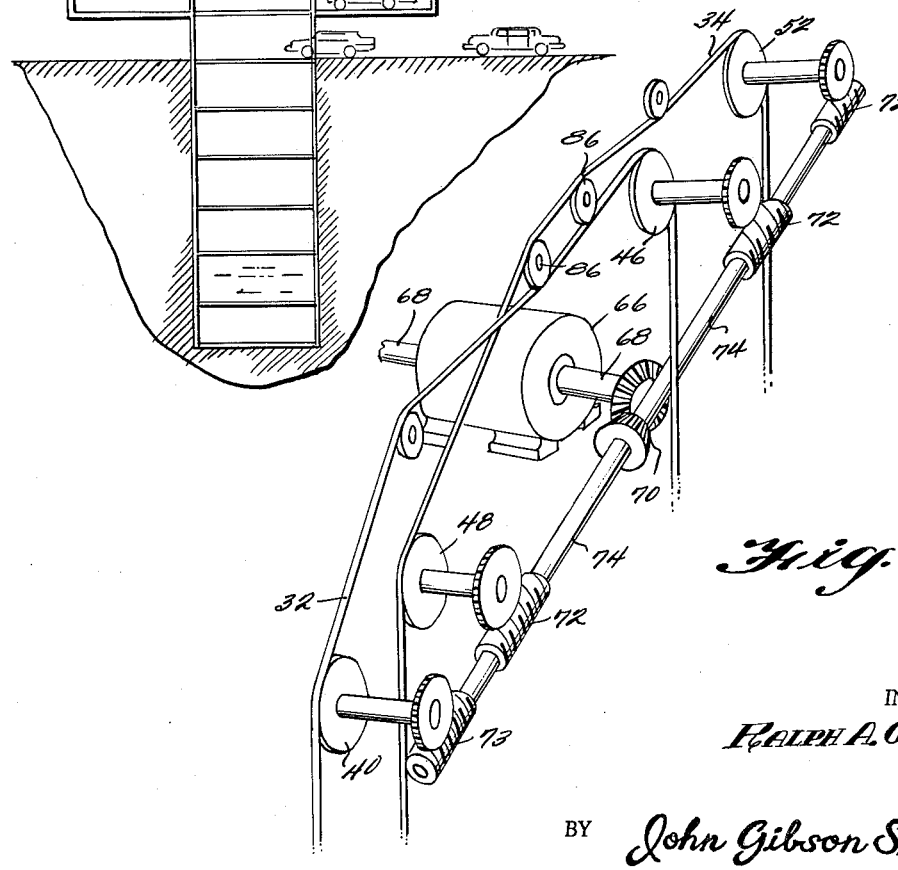

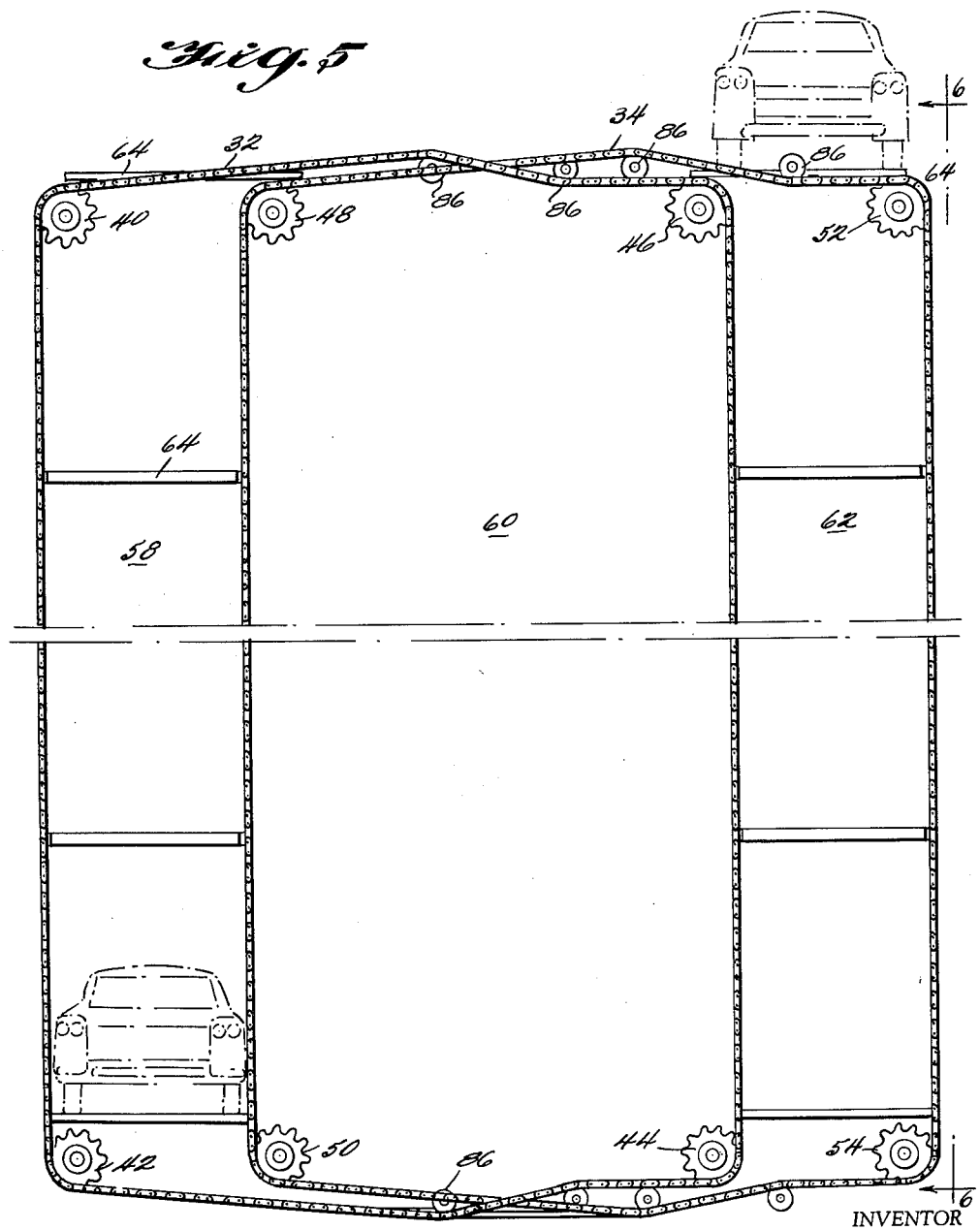

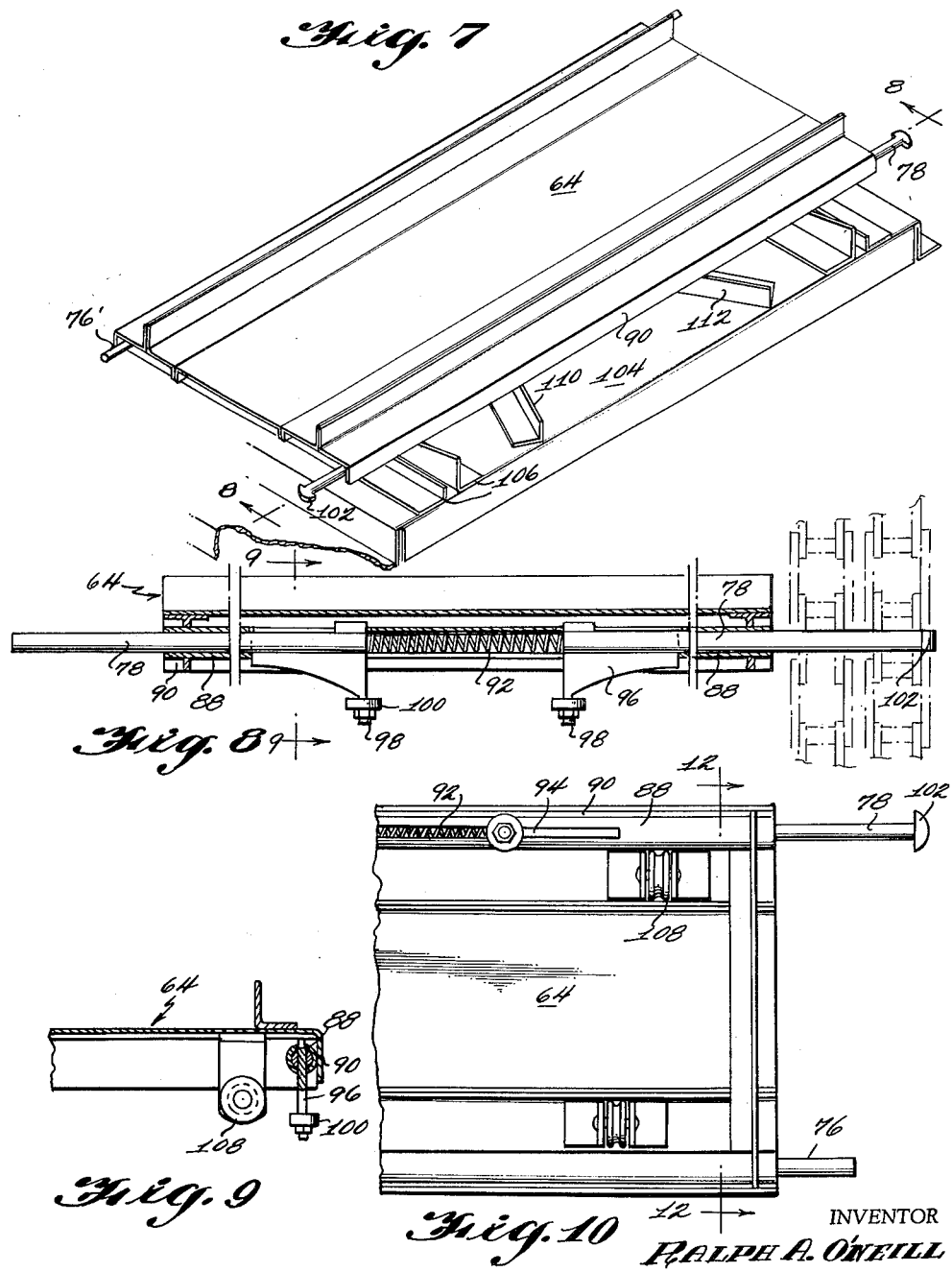

May 15, 1962  R. A. O'NEILL  3,034,666
ELEVATOR APPARATUS
Filed Sept. 5, 1958  6 Sheets-Sheet 6

INVENTOR
RALPH A. O'NEILL

BY John Gibson Semmes
ATTORNEY

United States Patent Office 3,034,666
Patented May 15, 1962

3,034,666
ELEVATOR APPARATUS
Ralph A. O'Neill, 4541 N. 19th St., Arlington, Va.
Filed Sept. 5, 1958, Ser. No. 759,293
4 Claims. (Cl. 214—16.1)

The present invention relates to elevator apparatus, particularly a continuous conveyance apparatus for the storing and parking of automobiles in a multi-storied building.

Numerous previous inventors have attempted to develop mechanical means for the storage and parking of automobiles in urban areas. Principal shortcomings of earlier systems have been their size and complexity, which have made construction prohibitively expensive, their proclivity towards mechanical breakdown, and their inability to provide for the parking of more than one vehicle at a time. The present invention contemplates a continuous conveyance in apparatus for parking and storage of automobiles comprising two inner opposed roller chains and two outer opposed roller chains overlapping portions of said inner chains. Each of the four roller chains is mounted upon four quadrilaterally disposed sprockets. Automobile platforms are fixedly mounted at both ends to the said opposed inner chains and removably attached at both ends to the said outer chains. According to the instant invention, automobile platforms are conveyed in a quadrangle, being supported by inner and outer roller chains during vertical up and down movement and being pulled by the inner roller chains and supported partially by a horizontal floor during transverse movement across by the bottom and top of the quadrangle. Previously, inventors have been unable to device chain-driven conveyance apparatus which lent proper rigidity to the storing and parking of automobiles and which could be operated in a continuous cycle without removal of the automobile from a supporting platform. The instant invention provides the rigidity of four synchronously driven roller chains. The use of four roller chains instead of two, is possible because means are provided for disengaging the automobile platforms from the two outer chains while the platform is being conveyed transversely by the inner chains through overlapping portions of the inner and outer roller chains. While the platforms are disengaged from the outer chains supplemental rigidity and support is supplied by longitudinal tracks fastened to a bottom and top floor positioned between the inner chains in each apparatus.

The instant apparatus is also unique in that the various automobile platforms are simultaneously accessible from each storage floor through which the system operates. Accordingly, there is an economy in operation, since presently used systems are of the "one way" sort, requiring a separate conveyor trip for each storing of the vehicle. Thus, while an automobile is being loaded on the ground floor all other automobiles being conveyed may be simultaneously off-loaded for parking on the other floors.

This uniquie simultaneous accessibility suggests that the system might effectively serve a department store or the like wherein patrons could simultaneously board on each floor up going platforms in one side of the quadrangular conveyor system and simultaneously depart on each floor from down going platforms in the opposite side of the quadrangular conveyor system. Patrons could be removed from the platforms during horizontal transversal of the conveyor through top and bottom floors of the building where installed. Also, the conveyor might be employed for warehousing of palletized goods such as cotton bales, canned items and the like.

In presently used mechanical storing and parking systems an average of one attendant is required for handling of every ten automobiles. It is contemplated that approximately three attendants could handle five hundred automobiles stored and parked according to the present invention. A single operator with conventional electric controls could operate various concentric quadrangular conveyors delivering parked or stored automobiles to patrons within one minute, since the roller chains may be driven efficiently at 200 ft. per minute.

Accordingly, it is an object of the present invention to provide a conveyor for parking a large number of cars in a relatively small area.

Another object of the invention is to provide increased efficiency and economy in the storing and parking of automotive vehicles in a multi-storied building.

Another object of the invention is to provide in an endless conveyor system opposed parallel roller chain circuits and means for disengaging load-carrying platforms therefrom.

Another object of the invention is to provide a quadrilateral roller chain conveyor for automobile parking units, said conveyor having automobile support platforms mounted thereon.

Another object of invention is to provide in a multi-storied parking unit a conveyor simultaneously accessible at front and back and on all floors which the conveyor serves.

Additional objects of invention will become apparent from this specification and the attached drawings wherein:

FIGURE 2 is a vertical sectional view of a multi-storied parking unit centrally embodying concentric conveyors, which conveyors may be used for dynamic storage of vehicles, and embodying parking stalls adjacent said concentric conveyors, which may be used for static storage of automobiles;

FIGURE 3 is an enlarged perspective view of roller chain links and a type vehicle platform support bar employed;

FIGURE 4 is an enlarged perspective view of parallelly spaced partially overlapping outer and inner roller chains and synchronous drive means therefor;

FIGURE 5 is a front elevation showing symmetric quadrilateral formation of outer and inner roller chains overlappingly disposed so as to provide side shafts for vertical conveyance of automobiles, a central open shaft for containment of driving means and top and bottom support for horizontal conveyance of automobiles from one side shaft to the other;

FIGURE 7 is a perspective view of an automobile platform traversing a floor attached cam at the top or bottom of the conveyor;

FIGURE 8 is a sectional view, taken along section line 8—8 of FIGURE 7, showing an automobile platform steel support bar which is disengageable from the outer chains;

FIGURE 9 is an enlarged sectional view, taken along section line 9 of FIGURE 8, showing automobile platform rollers 108 and steel support bar cam-engaging roller means;

FIGURE 10 is a bottom plan view of one-half of an automobile platform showing rollers 108 and fixed and disengageable retractible and immovable steel support bars in position.

Figure 6:
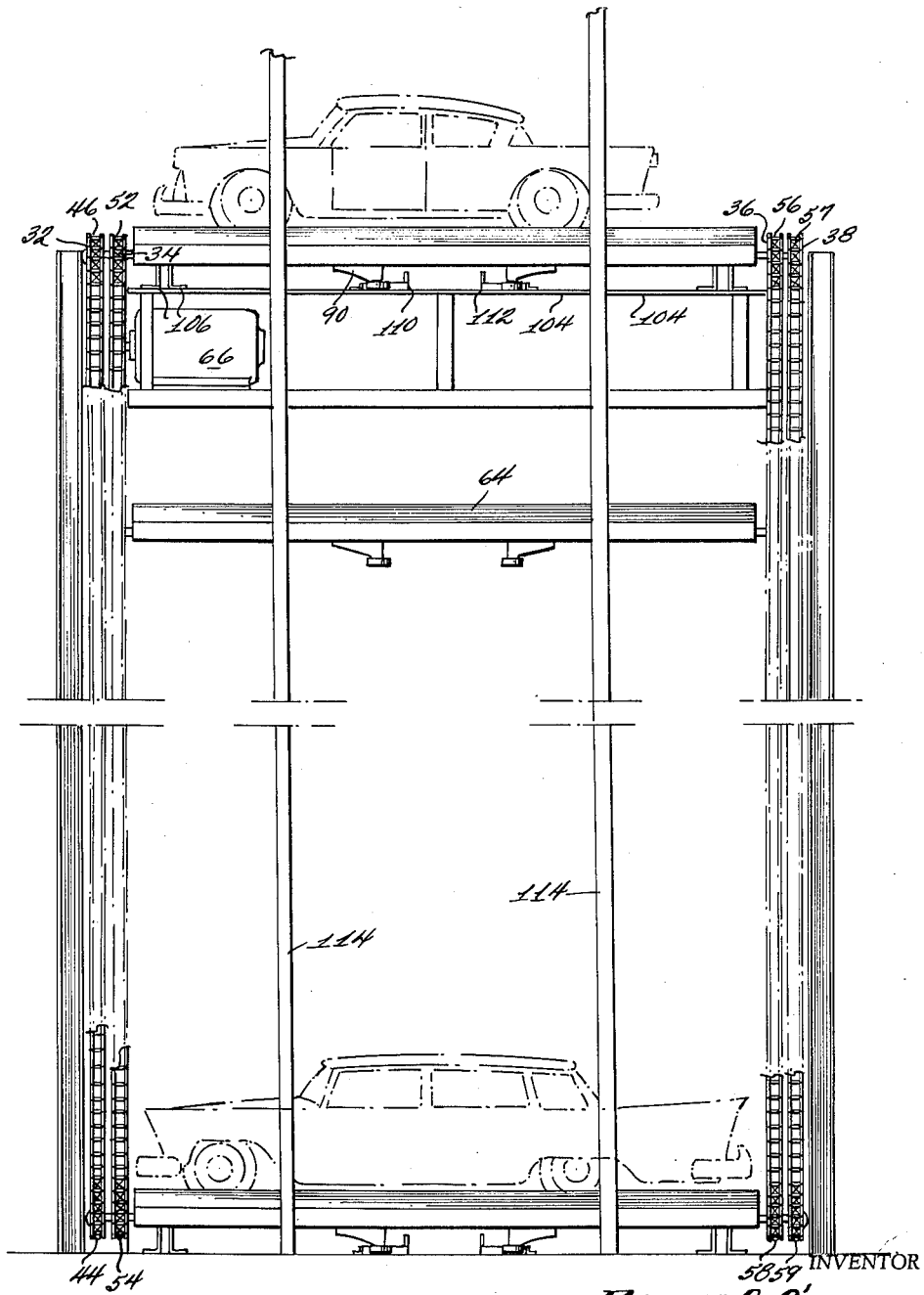
FIGURE 6 is a side elevation taken along line 6—6 of FIGURE 5 and showing outer and inner roller chains and automobile platforms mounted therebetween.
Figure 11:
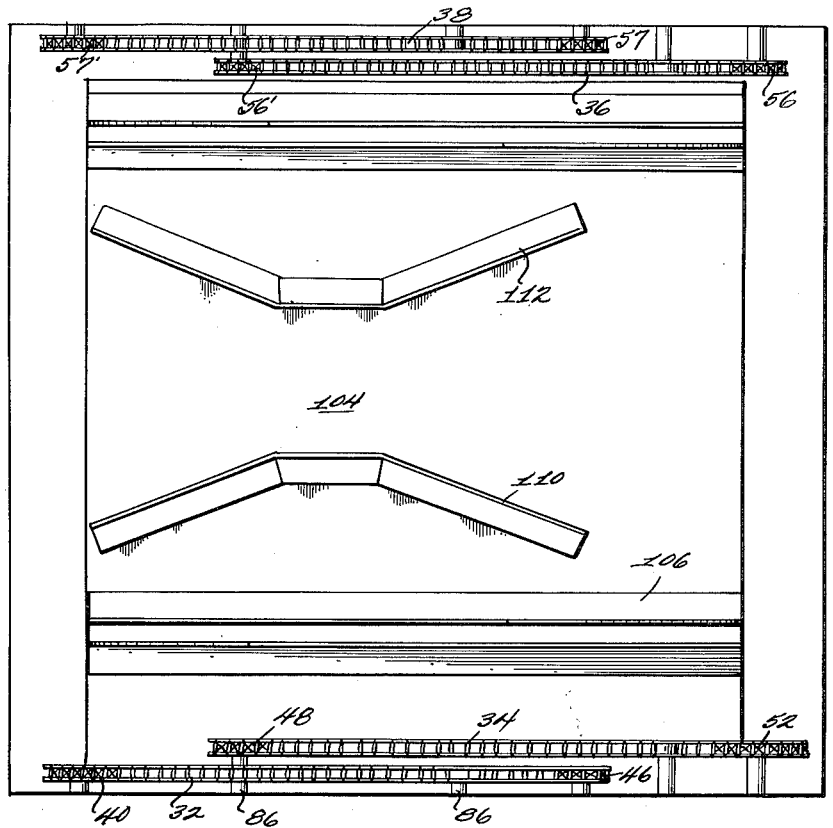
FIGURE 11 is a fragmentary top plan view of the bottom floor positioned between the two inner chains and showing overlapping portions of inner and outer chains, cam means for disengaging steel support bars and longitudinal support tracks.
Figure 12:
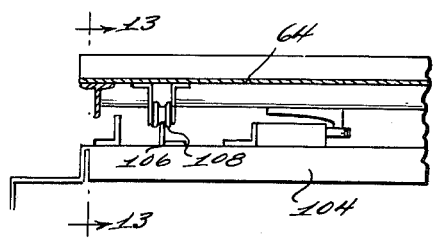
FIGURE 12 is an enlarged sectional view taken along line 12—12 of FIGURE 10, showing the automobile platform engaging the longitudinal support tracks and cam means disengaging a steel support bar from its roller chains.

As shown in FIGS. 5, 6 and 11, the conveyor mechanism comprises four symmetrically, quadrilaterally disposed roller chains 32, 34, 36, and 38, synchronously driven in four separate closed circuits. The four chains convey automobile platforms 64 in coordinated unison at equal speeds, around sprockets 40 to 57′, mounted at the four corners of the four quadrilateral circuits. The roller chains rotate within the corners of three parallel adjacent vertical compartments, or shafts, 58, 60 and 62 which may be subterranean, or within an elevated structure, or a combination of both. The two side shafts 58 and 62 will be completely unobstructed and somewhat wider than a car. Middle shaft 60, provides space for mounting of driving motors and accessibility thereto as well as office space for operating the conveyor and handling of parking patrons.

Attached at right angles to the four chains, at spaced intervals are horizontal platforms 64 for conveying automobiles for parking. Platforms 64 carrying the automobiles travel vertically up and down within the two side shafts, 58 and 60, and horizontally across from one shaft to the other at the top and bottom of the conveyor. All the while platforms 64 are maintained at safe equidistance and the conveyor operates as a dual or up and down elevator, with the chains revolving completely around a quadrilateral circuit. As in the case of automatic elevators, the mechanism may be stopped at established portals for loading or unloading cars, by pushbutton operation.

In order to obtain such performance, the following arrangements and devices are desirably employed. Each roller chain revolves in a separate quadrilateral closed circuit. In a front elevation view, as shown in FIGURE 5, shaft 58 being at left, outer chain 32 is vertically positioned at the front left hand side of shaft 58, riding on sprockets 40 and 42 which are mounted at top and bottom, respectively of said left side. Manifestly, idler wheels (not illustrated) may be used in lieu of sprockets at the bottom of side and middle shafts. Chain 32 is rotatable in either direction in a plane parallel to the elevation, or front face of the shafts. From sprocket or idler wheel 42 at lower left front corner of shaft 58 chain 32 continues horizontally across the bottom of the shaft 58, the bottom of shaft 60 to left front corner of shaft 62 and by turning on sprocket or idler wheel 44 mounted in lower right front corner of shaft 60, chain 32 rises vertically in the front side of shaft 62 to sprocket 46 at top right front corner of shaft 60, thence horizontally traverses shaft 60 and shaft 58 and at the left front corner of shaft 58, sprocket 40 lowers vertically to left front corner of shaft 58, sprocket 42, thus completing its closed circuit, operating always in left front side of shaft 58 and left front side of shaft 62 when in vertical motion.

As shown in FIGURE 6, outer chain 38 may be called the analogue of chain 32, since it operates in a parallel plane in the left rear side of the same shafts 58 and 62. The sprockets of chains 32 and 38 are on the same axes, but through axles will be used only for middle sprockets 48, 46, 56′ and 57 adjacent floor 104. Through axles will not be used for side sprockets 40, 52, 57′ and 56 as passage between these sprockets must remain unobstructed.

Inner chain 34, in juxtaposition to outer chain 32, operates vertically in right front sides of shafts 58 and 62 in a parallel plane slightly offset to the rear of and overlapping the plane of chain 32 at the top and bottom of shaft 60.

Inner chain 36 is the analogue of chain 34, rotates in a parallel plane in the right rear sides of shafts 58 and 62, and is suspended on middle sprockets 48, 56′, etc. (which may have common axles) and side sprockets 52, 56, etc. which do not have a common axle.

The four load-carrying roller chains 32, 34, 36 and 38 move at uniform speeds being rotated synchronously by the head sprockets 40, 46, 48, 52, 56, 56′, 57 and 57′ at tops of shafts 58, 60 and 62. Said sprockets may be chain-linked for transmission by a common power source 78, may be individually driven by synchronized motors or preferably may be driven by a central electric motor 66 having the equivalent of 135 H.P. for each twenty platforms. A standby motor (not illustrated) may be employed. As shown in FIG. 4 motor 66 has drive shaft 68 which actuates at both ends bevel gears 70 attached to driving shafts 74 which have worm gears 72 for actuating the drive sprockets.

As shown in FIGS. 10 and 3, each platform 64 is attached to the four load chains, 32, 34, 35, 38 by means of steel bars 76 and 78, at the corners of each platform. Fixed bars 76 penetrate circular orifices 80 (not shown) in inner chain links 82. Disengageable bars 78 penetrate slotted aperture 80 in the side faces of links 82 of the outer roller chains. Chain links 82 are individually joined by pins 84. Fixed bars 76 attaching platforms to inner roller chains 34 and 36 may be locked in position within the chain links. However, disengageable bars 78, attached to outer chains 32 and 38 are disengageable at top and bottom points in the circuit while traversing overlapping portions of the inner and outer chains.

Circuits of outer chains 32 and 38, being placed slightly outside of circuits of inner chains 34 and 36, are thus positioned to avoid interference and clear the chains 34 and 36 at overlaps by idler rollers 86. All four chains are of equal length and are rotated in unison link for link by their respective drive sprockets.

The disengageable attachment bars 78 joining each automobile platform 64 to outer chains 32 and 36 are two in number, one per chain, exactly alike in structure and function. These bars are disengaged simultaneously as described below. Said bars are parts of the supporting longitudinal section on one edge of each platform, and preferably are of round suitably high tensile strength steel (for example 170,000 lbs. each which will render each platform 680,000 lbs. support). As shown in FIG. 8, the two bars 78 may slide within an enclosing tube 88, attached along the entire length of lower edge, or flange 90, of the supporting longitudinal member of each platform. Enclosing tube 88, being about 20-ft. long, will also contain a coiled spring 92, located and fixed midway from bar 78 ends, and bearing in compression against the butt ends of the two enclosed attachment bars. The enclosing tube 88 is provided with two narrow slots or keyways 94, about 12-in. long, longitudinally through the bottom and top surface of the tube wall, located beyond the area of spring 92 when fully compressed, and immediately forward of the butts of the bars 78.

To prevent rotation of the retractable attachment bars 78 spline 96, fitting into keyway 94, is provided in each bar just forward of the butt. Spline 96 when in torque due to cam action is supported by keyway 94. Said spline 96 slides within the tube keyway 94 when bar 78 is in motion, and also serves to arrest the throw and retraction of the bar 78 at fixed points. Each spline 96 at its end adjacent to butt of bar 78, is constructed with a vertical protrusion or cam leg 98. To reduce friction when actuated by the cam, a roller bearing 100 is attached to lower portion of cam leg 98.

The retractable attachment bars 78 protrude beyond the ends of the enclosing tube 88. The outer end or head of each bar 78 is provided with an oval shaped knob 102 which along its horizontal axis, is slightly greater in width than the diameter of the bar 78 shank. Said knob 102 will readily slide in or out of corresponding slots 80 in certain side plates 82 of roller chains 32 and 38 when the plates 82 are in transverse, or horizontal position, but knob 102 locks the bar 78 after insertion when the chain links is in vertical position.

Figure 13:
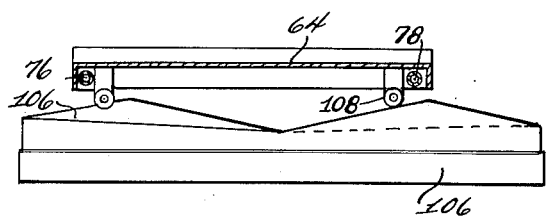
FIGURE 13 is an enlarged side elevation showing engagement of platform on support tracks taken along section line 13—13 of FIGURE 12.

When car platforms 64 are at bottom or top of the roller chain circuits and in horizontal traversals, their loads are not supported entirely by the chains. During traversal of the top of shafts 58, 60 and 62 the chains ride on idler rollers 86, located beneath the claims, which rollers may be mounted on cross beams supported by the frame or structure. In the section at the top and bottom of middle shaft 60 floors 104 are provided with longitudinal, canted tracks 106 (shown in FIG. 13). Platforms 64 with rollers 108 engage tracks 106 while traversing floors 104. As illustrated in FIGS. 7 and 13, the individual tracks 106 comprising a pair of tracks supported adjacent overlapping portions of the inner and outer chains are oppositely canted, as are inner chain 34 and outer chain 32 (see FIG. 5). The canting of the chains defines the narrow area of intersection of the chains and the opposite canting of tracks 106 in each adjacent pair insure complete support of platform 64 in both clockwise and counterclockwise drive of the conveyor. Idler rollers 86 are similarly provided at bottoms of the three shafts, and bottom floor 104 may extend into the bottoms of the side shafts 58 and 62.

There are two points of overlapping interference in the operation of the roller chain circuits. These occur at the top and bottom of middle shaft 60 where chains 32 and 34 and 36 and 38, respectively, overlap. At these points the disengageable attachment bars 78 of each car platform 64 are withdrawn from outer chains. This disengagement is effected by cams 110 and 112, mounted on floor 104, located between inner chains 34 and 36. Cams 110 and 112 engage the cam leg roller bearings 100 of the splines 96 thus causing the bars 78 to slide inwardly within enclosing tube 88, against coil spring 92, a distance of about 10 inches, to clear driving sprockets 46, 48 and 57 and 56, etc. (at the four corners of middle shaft 60) and chains 32, 34, 36 and 38 while the platform traverses the over-lapping portion of the inner and outer chains.

Car platform 64 and its automobile load continues in traversal by pulling force of inner chains 34 and 36 to which car platforms are fixed by means of bars 76. When edge of platform 64 adjacent bar 78 has cleared the overlapping chains and traversed beyond, cams 110 and 112 gradually disengage cam rollers 108 of attachment bars 98 and coil springs 92 force bars 78 back into engagement with slotted apertures 80 of outer chains 32 and 38. This disengagement and re-engagement takes place while car platform 64 and its load are moving on rollers 108 on tracks 106 across floor 104 and is controlled with precision. Similar disengagement of attachment bars 78 can be produced by the use of electro-magnetic means which would be less subject to binding and wear. Manifestly, emergency trip-switch or electro-magnetic means may be provided on floor 104 in the path of cam rollers 108 for stopping the entire conveyor system in the event that re-engagement of bars 78 in outer chains 32 and 38 is not effected.

Operation of the conveyor mechanism is relatively simple and mechanically efficient because of the balanced loads and lack of wear and abrasion on the moving parts. Four conventional heavy duty roller chains, each in separate closed symmetric quadrilateral circuits, mounted on sprockets, are located so as to delineate three vertical, parallel shafts. The chains rotate in exact unison at equal speeds, moving vertically in parallel lines along the sides of the shafts and traversing horizontally all three shafts at top and bottom.

Platforms, for carrying stored or packed cars, are attached to the four roller chains at regular intervals. The spacing between platforms is 12′ to 14′, so as to permit a car to traverse out of the bottom of an outer shaft with clearance for the platform following. The trajectory of conveyance platforms and cars is preferably in the form of a quadrangle and may be reversible or continuous in either direction, although the trajector may be circular.

Figure 1:
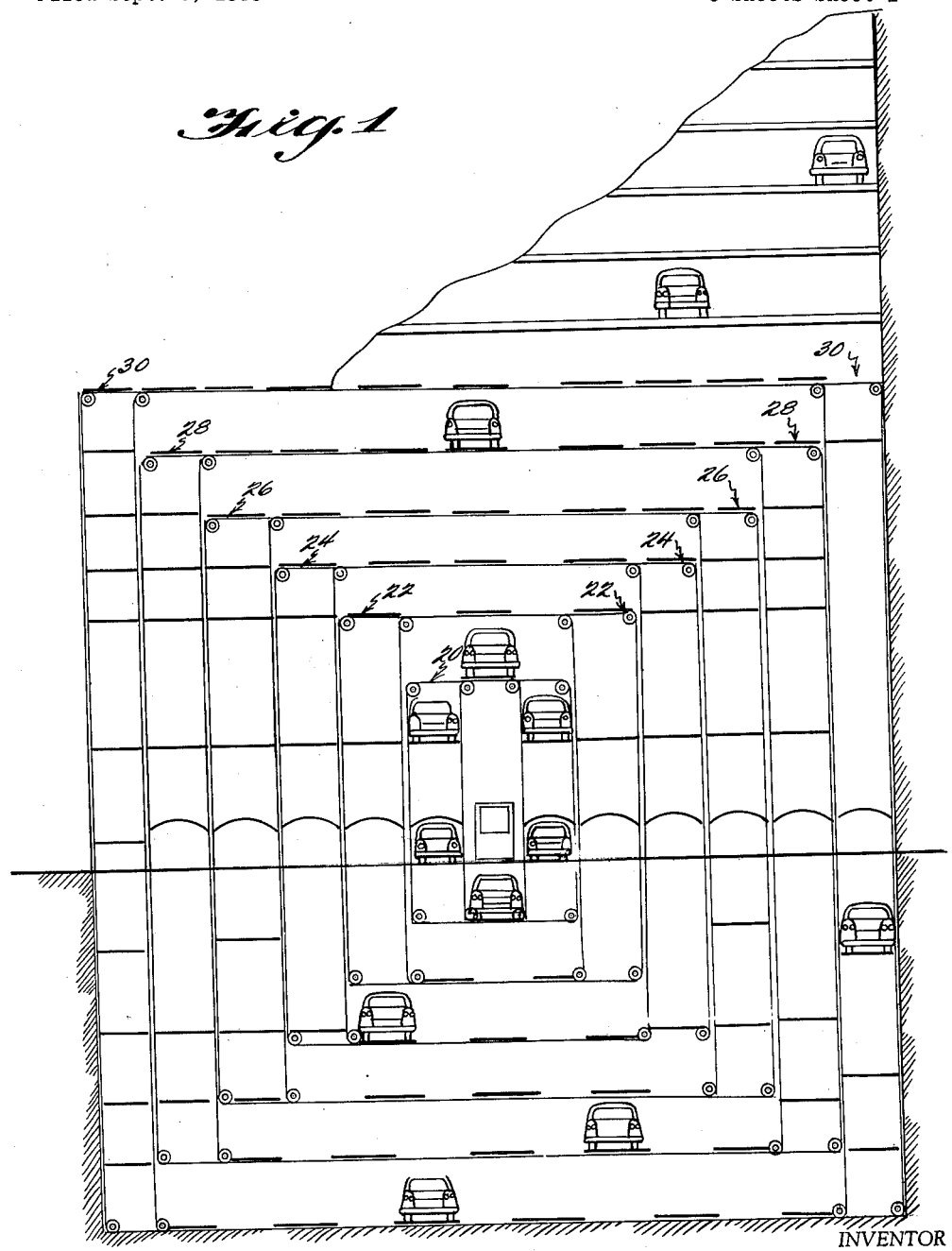
FIGURE 1 is a schematic drawing of a series of concentric automobile roller chain conveyors constructed according to the present invention.

A convenient and practical arrangement will provide for twenty cars in the conveyor circuit, occupying a space of about 20′ x 22′ at its base and about 120′ in height. As shown in FIGS. 1 and 2 the bottom of bays of the circuit will be underground, due to location of bottom sprockets. As will be apparent in a smaller conveyor such as illustrated in FIG. 5 the bottom bays may be at street level. At ground level automatic garage doors will be provided in each of the side shafts 58 and 62, enabling two cars to be loaded or unloaded at the same time. In cases where the conveyor is used as a continuous elevator for a large garage two doors, landings or gages can be located at each floor for moving cars into and out of side shafts 58 and 62. In a parking unit system of concentric conveyors and adjacent storage bays, as illustrated in FIG. 2, four bays may be provided for each conveyor at each floor. Thus, two bays would afford forward and rear accessability to automobile platforms in one side vertical shaft and two bays would afford forward and rear accessibility to automobile platforms being conveyed in the other side vertical shaft. The automobiles may be driven over the landings and between the platforms and the storage bays by attendants or mechanical means for movement of the automobiles may be provided. Such mechanical means might comprise means for tilting automobile platforms so that automobiles might be urged into the bays, shock absorbing systems within the bays and means for tilting autos in the bays so that the autos could be urged back onto the automobile plateforms. This conveyor arrangement will eliminate the need for ramps which now occupy a large, unproductive, portion of drive-in parking garages.

The unit may be simply described as a dual, or two shafted, elevator capable of continuous and balanced motion in either direction. Conventional electric controls to provide for starting and automatic stopping at desired stations are features of the mechanism. The usual elevator safeguards such as guides, brakes, and governed speeds are included in each installation.

In addition to the obvious useful nature of the mechanism, great advantages in economy and efficiency are inherent in the simplicity of the design and paucity of working parts. This, plus an even distribution of loads, will result in long life and smoothness of operation with a minimum of wear and tear. The lack of complicated and unusual mechanical devices in the unit results in low cost installation, operation and maintenance.

It is to be understood that the form of invention, herewith shown and described, is to be taken as a preferred example of the same, and that various changes in the shape size and arrangement of parts may be resorted to, without departing from the spirit of invention, or the scope of the subjoined claims.

I claim:

1. An elevator continuous conveyor comprising two inner endless chain circuits and two outer endless chains, said inner and outer chains being of substantially equal length, said outer chains overlapping said inner chains and being parallel and adjacent thereto; adjacent overlapping portions of said chains being inclinedly disposed with respect to each other to define a narrow area of intersection of said chains; one or more support platforms positioned apart between said inner chains, each support platform having at one end fixed support bars locked to both said inner chains and the other end of each support platform having disengageable support bars extending into apertures within said outer chains; means for synchronously driving said inner and outer chains; and means adjacent said overlapping portions of said chains for simultaneously disengaging the latter support bars.

2. An elevator continuous conveyor as in claim 1, said last-mentioned means including a disengaging cam supported between overlapping portions of said chains, said disengageable support bars being guided by said cam disengagingly inwardly from said outer chains, and an inclined track means vertically supporting said platforms during conveyance through overlapping portions of said chains.

3. An elevator continuous conveyor as in claim 1, in combination with one or more similar conveyors, concentrically arranged throughout a plural level building for parking and storage of vehicles, with plural level storage units located at either side of said conveyor so as to be accessible for loading or unloading vehicles from the levels in which said conveyors operate.

4. An elevator continuous conveyor as in claim 2, said disengaging cam being configured to guide inwardly and disengagingly said disengageable support bars during clockwise and counterclockise drive of said conveyor.

References Cited in the file of this patent
UNITED STATES PATENTS

| 1,564,100 | Morton | Dec. 1, 1925 |
| 1,771,022 | Wachs et al. | July 22, 1930 |

FOREIGN PATENTS

| 853,088 | France | Mar. 9, 1940 |
| 685,389 | Great Britain | Jan. 7, 1953 |